United States Patent
Matsumoto et al.

(10) Patent No.: US 9,279,199 B2
(45) Date of Patent: Mar. 8, 2016

(54) METHOD AND APPARATUS FOR MANUFACTURING CLEANING MEMBER

(71) Applicant: Unicharm Corporation, Shikokuchuo-shi, Ehime (JP)

(72) Inventors: Takayuki Matsumoto, Kanonji (JP); Shigetomo Takahashi, Kanonji (JP); Yuji Yamashita, Kanonji (JP); Hiroaki Goto, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 380 days.

(21) Appl. No.: 13/749,726

(22) Filed: Jan. 25, 2013

(65) Prior Publication Data

US 2014/0183929 A1  Jul. 3, 2014

(30) Foreign Application Priority Data

Dec. 29, 2012  (JP) ................................. 2012-289179

(51) Int. Cl.
*D02J 1/18* (2006.01)
*D01D 11/02* (2006.01)
(Continued)

(52) U.S. Cl.
CPC ... *D02J 1/18* (2013.01); *A46D 1/04* (2013.01); *B08B 1/006* (2013.01); *B32B 5/022* (2013.01);
(Continued)

(58) Field of Classification Search
CPC ................. D02J 1/18; D02J 1/20; D02J 1/22; D02J 1/227; D02J 1/228; B65H 51/005; D01D 11/02; D01D 11/06; A24D 3/0204; A46D 1/04

USPC ........ 28/282, 283, 102, 220, 246; 26/99, 101, 26/102; 19/66 T, 65 T
See application file for complete search history.

(56) References Cited

U.S. PATENT DOCUMENTS

| 345,644 A | 7/1886 | Moseman |
| 470,898 A | 3/1892 | Reiffel |

(Continued)

FOREIGN PATENT DOCUMENTS

| EP | 0546580 | 6/1993 |
| EP | 2009152 | 12/2008 |

(Continued)

OTHER PUBLICATIONS

International Search Report and Written Opinion Mailed Mar. 25, 2014, corresponds to International Application No. PCT/JP2013/085170.

(Continued)

Primary Examiner — Amy Vanatta
(74) Attorney, Agent, or Firm — Hauptman Ham, LLP (57) ABSTRACT

In a method for manufacturing a cleaning member comprising opened fiber bundle, in order to correct twisting of fiber bundle in the path for feeding the fiber bundle from a storage container to a driving roller to thereby stabilize manufacturing process, and in order to pre-open the fiber bundle in the path from a driving roller to the opening step to thereby speed-up the opening step, fiber bundle drawn out continuously from a storage container in a first direction is wound onto a non-rotational bar, and after being fed in a second direction, is fed to a first driving roller, and the fiber bundle fed from the first driving roller in a third direction is wound onto a second non-rotational bar, and after being fed in a fourth direction, is fed to a second driving roller and to the following opening step.

14 Claims, 4 Drawing Sheets

(51) Int. Cl.
  *B08B 1/00* (2006.01)
  *A46D 1/04* (2006.01)
  *B32B 5/02* (2006.01)
  *B32B 5/12* (2006.01)
  *B32B 5/26* (2006.01)

(52) U.S. Cl.
  CPC ... *B32B 5/12* (2013.01); *B32B 5/26* (2013.01); *D01D 11/02* (2013.01); *B32B 2250/20* (2013.01); *B32B 2262/0284* (2013.01); *B32B 2262/12* (2013.01); *B32B 2432/00* (2013.01)

(56) References Cited

U.S. PATENT DOCUMENTS

| | | | |
|---|---|---|---|
| 1,847,065 A | 2/1932 | Munch | |
| 1,989,048 A | 1/1935 | Winter et al. | |
| 2,733,064 A | 1/1956 | Martin | |
| 2,738,973 A | 3/1956 | Werner Koch | |
| 2,836,418 A | 5/1958 | Blattner et al. | |
| 2,904,335 A | 9/1959 | Rabinow | |
| 2,926,392 A | 3/1960 | Jackson | |
| 2,960,023 A | 11/1960 | Greiner et al. | |
| 3,022,999 A | 2/1962 | Mead | |
| 3,095,343 A | 6/1963 | Berger | |
| 3,362,707 A | 1/1968 | Lauren | |
| 3,370,848 A | 2/1968 | Bartlett | |
| 3,376,609 A * | 4/1968 | Kalwaites | 28/103 |
| 3,566,451 A | 3/1971 | Welgand | |
| 3,592,371 A * | 7/1971 | Wyatt et al. | 28/282 |
| 3,608,024 A * | 9/1971 | Yazawa | D01D 5/423 156/229 |
| 3,724,037 A | 4/1973 | Nicholson et al. | |
| 3,737,950 A * | 6/1973 | Bolliand et al. | 28/282 |
| 3,827,113 A | 8/1974 | Vidal et al. | |
| 3,840,941 A * | 10/1974 | Neveu | 28/220 |
| 3,860,127 A | 1/1975 | Fassman | |
| 3,907,128 A | 9/1975 | Cathers | |
| 3,912,258 A | 10/1975 | Martin | |
| 3,966,196 A | 6/1976 | Simeth | |
| 4,190,241 A | 2/1980 | Krueger | |
| 4,319,744 A | 3/1982 | Nagel et al. | |
| 4,385,757 A | 5/1983 | Muller | |
| 4,514,128 A | 4/1985 | Hedrick | |
| 4,640,161 A | 2/1987 | Kurk | |
| 4,664,368 A | 5/1987 | Bouwens et al. | |
| 4,961,805 A | 10/1990 | Siebert | |
| 5,060,351 A | 10/1991 | Street | |
| 5,060,929 A | 10/1991 | Kohlmann | |
| 5,168,786 A | 12/1992 | Huggins et al. | |
| 5,230,764 A | 7/1993 | Moll | |
| 5,241,731 A * | 9/1993 | Stuart | 28/282 |
| 5,253,762 A | 10/1993 | Duncan | |
| 5,332,210 A | 7/1994 | Silverberg et al. | |
| 5,355,567 A | 10/1994 | Holliday | |
| 5,417,912 A | 5/1995 | Merry | |
| 5,431,530 A | 7/1995 | Kobayashi et al. | |
| 5,435,541 A | 7/1995 | Fornay et al. | |
| 5,516,091 A | 5/1996 | Nakayama | |
| 5,535,576 A | 7/1996 | Walintschek | |
| 5,779,432 A | 7/1998 | Pena | |
| 6,286,403 B1 | 9/2001 | Rosenthal et al. | |
| 6,491,492 B1 | 12/2002 | Cook | |
| 6,494,450 B2 | 12/2002 | Tsurumaki | |
| 6,554,937 B1 | 4/2003 | Kenmochi et al. | |
| 6,572,101 B2 | 6/2003 | Kaya et al. | |
| 6,585,842 B1 * | 7/2003 | Bompard | B29C 70/202 156/166 |
| 6,743,392 B2 * | 6/2004 | Tanaka | B29B 15/10 264/136 |
| 6,780,264 B2 | 8/2004 | Nakata et al. | |
| 7,003,856 B2 | 2/2006 | Hayashi et al. | |
| 7,156,011 B2 | 1/2007 | Morris et al. | |
| 7,300,053 B2 | 11/2007 | Asano | |
| 7,339,675 B2 | 3/2008 | Nishida et al. | |
| 7,536,761 B2 * | 5/2009 | Nestler | D02J 1/18 28/220 |
| 7,571,524 B2 * | 8/2009 | Kawabe et al. | 28/283 |
| 8,100,038 B2 | 1/2012 | Sandahl | |
| 8,201,429 B1 | 6/2012 | Matsunaga | |
| 8,357,415 B2 | 1/2013 | Furusawa | |
| 8,448,335 B2 | 5/2013 | Lundgren et al. | |
| 2002/0026699 A1 | 3/2002 | Hayashi et al. | |
| 2002/0148061 A1 | 10/2002 | Tanaka et al. | |
| 2003/0000934 A1 | 1/2003 | Tanaka et al. | |
| 2003/0127177 A1 | 7/2003 | Lane | |
| 2003/0172506 A1 * | 9/2003 | Guirman et al. | 28/282 |
| 2004/0149095 A1 | 8/2004 | Miyatake et al. | |
| 2005/0005381 A1 | 1/2005 | Tanaka et al. | |
| 2005/0039285 A1 | 2/2005 | Tanaka et al. | |
| 2005/0066496 A1 * | 3/2005 | Ames et al. | 28/282 |
| 2005/0097695 A1 | 5/2005 | Tanaka et al. | |
| 2005/0097696 A1 | 5/2005 | Tanaka et al. | |
| 2005/0132521 A1 | 6/2005 | Tanaka et al. | |
| 2005/0139513 A1 | 6/2005 | Miller | |
| 2005/0177967 A1 | 8/2005 | Tanaka et al. | |
| 2005/0188490 A1 | 9/2005 | Tanaka et al. | |
| 2005/0193514 A1 | 9/2005 | Tanaka et al. | |
| 2005/0198760 A1 | 9/2005 | Tanaka et al. | |
| 2005/0258589 A1 | 11/2005 | Michler et al. | |
| 2006/0005675 A1 | 1/2006 | Scheffer et al. | |
| 2006/0016035 A1 | 1/2006 | Tanaka et al. | |
| 2006/0016036 A1 | 1/2006 | Tanaka et al. | |
| 2006/0048325 A1 | 3/2006 | Tsuchiya | |
| 2006/0051434 A1 | 3/2006 | Tsuchiya | |
| 2006/0101601 A1 | 5/2006 | Fujiwara et al. | |
| 2006/0156876 A1 | 7/2006 | Sussmeier et al. | |
| 2006/0179989 A1 | 8/2006 | James et al. | |
| 2007/0068353 A1 | 3/2007 | Piucci et al. | |
| 2007/0101564 A1 | 5/2007 | Nestler et al. | |
| 2008/0047087 A1 | 2/2008 | Levy et al. | |
| 2009/0049633 A1 | 2/2009 | Takabayashi et al. | |
| 2009/0165230 A1 | 7/2009 | Tsuchiya et al. | |
| 2009/0172904 A1 | 7/2009 | Tsuchiya et al. | |
| 2009/0196538 A1 | 8/2009 | Liou et al. | |
| 2009/0255078 A1 | 10/2009 | Wada et al. | |
| 2010/0000382 A1 | 1/2010 | Maddalon | |
| 2010/0015383 A1 | 1/2010 | Yamada | |
| 2010/0022978 A1 | 1/2010 | Kasai et al. | |
| 2010/0058907 A1 | 3/2010 | Kern | |
| 2010/0122613 A1 | 5/2010 | Sandahl | |
| 2010/0154156 A1 | 6/2010 | Takabayashi et al. | |
| 2010/0180745 A1 | 7/2010 | Hall | |
| 2011/0138942 A1 | 6/2011 | Murata | |
| 2011/0296965 A1 | 12/2011 | Manek-Honninger et al. | |
| 2012/0102678 A1 * | 5/2012 | Junker | D02J 1/18 19/144 |
| 2012/0132046 A1 | 5/2012 | Supe-Dienes | |
| 2012/0135227 A1 * | 5/2012 | Kawabe | 428/338 |
| 2012/0167736 A1 | 7/2012 | Yokoe | |
| 2014/0182429 A1 | 7/2014 | Saito et al. | |

FOREIGN PATENT DOCUMENTS

| | | |
|---|---|---|
| JP | 4535382 B1 | 11/1970 |
| JP | 48-89917 | 10/1973 |
| JP | 5345414 A | 4/1978 |
| JP | 56-169873 | 12/1981 |
| JP | 61-105364 U | 7/1986 |
| JP | 3-33222 | 2/1991 |
| JP | 5245090 A | 9/1993 |
| JP | 5-279950 | 10/1993 |
| JP | 5-316909 | 12/1993 |
| JP | 8-49126 | 2/1996 |
| JP | 8-259274 | 10/1996 |
| JP | 9-111644 A | 4/1997 |
| JP | 10-110346 | 4/1998 |
| JP | 11323718 A | 11/1999 |
| JP | 2000296083 A | 10/2000 |
| JP | 2001-246595 | 9/2001 |
| JP | 2001-288639 | 10/2001 |
| JP | 2002069781 A | 3/2002 |
| JP | 2003265390 A | 9/2003 |
| JP | 2003268663 A | 9/2003 |

(56) References Cited

FOREIGN PATENT DOCUMENTS

| | | |
|---|---|---|
| JP | 2003-293236 A | 10/2003 |
| JP | 2004-238615 A | 8/2004 |
| JP | 2004223692 A | 8/2004 |
| JP | 2005040641 A | 2/2005 |
| JP | 2005046645 A | 2/2005 |
| JP | 2005095665 A | 4/2005 |
| JP | 2005111284 A | 4/2005 |
| JP | 2005137929 A | 6/2005 |
| JP | 2005137930 A | 6/2005 |
| JP | 2005137931 A | 6/2005 |
| JP | 2005144198 A | 6/2005 |
| JP | 2005169148 A | 6/2005 |
| JP | 2005199077 A | 7/2005 |
| JP | 2005230573 A | 9/2005 |
| JP | 2005237975 A | 9/2005 |
| JP | 2006015164 A | 1/2006 |
| JP | 2006034990 A | 2/2006 |
| JP | 2006-152485 | 6/2006 |
| JP | 2006-166931 | 6/2006 |
| JP | 2006141483 A | 6/2006 |
| JP | 2006-265762 A | 10/2006 |
| JP | 2007002390 A | 1/2007 |
| JP | 2007029135 A | 2/2007 |
| JP | 2007029136 A | 2/2007 |
| JP | 2007-126810 A | 5/2007 |
| JP | 2007111297 A | 5/2007 |
| JP | 2007135666 A | 6/2007 |
| JP | 2007135774 A | 6/2007 |
| JP | 2007136156 A | 6/2007 |
| JP | 2007159612 A | 6/2007 |
| JP | 2007209460 A | 8/2007 |
| JP | 2007209461 A | 8/2007 |
| JP | 2007236690 A | 9/2007 |
| JP | 2007-283086 | 11/2007 |
| JP | 2008006260 A | 1/2008 |
| JP | 2008119171 A | 5/2008 |
| JP | 2008-125603 A | 6/2008 |
| JP | 2009-153914 | 7/2009 |
| JP | 2010-24575 | 2/2010 |
| JP | 2011-062802 A | 3/2011 |
| JP | 4675218 B2 | 4/2011 |
| JP | 2011084313 A | 4/2011 |
| JP | 4738311 B2 | 8/2011 |
| JP | 4878988 B2 | 2/2012 |
| JP | 2012-115783 A | 5/2012 |
| KR | 20110137660 | 12/2011 |
| WO | 2007/023965 | 3/2007 |
| WO | 2008/099733 A1 | 8/2008 |

OTHER PUBLICATIONS

International Search Report and Written Opinion mailed Feb. 18, 2014, corresponds to Internation Application No. PCT/JP2013/085179.
International Search Report and Written Opinion mailed Feb. 18, 2014, corresponds to PCT/JP2013/085203, for which an explanation of relevancy is attached.
Office Action mailed Jan. 15, 2015, corresponding to U.S. Appl. No. 13/749,721.
International Search Report Mailed Mar. 25, 2014, corresponds to International Application No. PCT/JP2013/085172.
International Search Report Mailed Mar. 18, 2014, corresponds to International Application No. PCT/JP2013/085177.
International Search Report Mailed Apr. 1, 2014, corresponds to International Application No. PCT/JP2013/085233.
Office Action mailed Apr. 29, 2015, corresponding to U.S. Appl. No. 13/749,717.

* cited by examiner

METHOD AND APPARATUS FOR MANUFACTURING CLEANING MEMBER

RELATED APPLICATIONS

The present application is based on, and claims priority from, Japanese Application Number 2012-289179, filed Dec. 29, 2012, the disclosure of which is hereby incorporated by reference herein in its entirety.

TECHNICAL FIELD

The present invention relates to a method and apparatus for manufacturing a cleaning member comprising an opened fiber bundle.

BACKGROUND ART

In a cleaning member comprising a fiber bundle as a substrate, an opened fiber bundle is utilized. A method for opening a fiber bundle has been known in which the fiber bundle is drawn out from a storage container by a driving roller and is fed to an opening step. (see, for example, Patent Literature 1).

CITATIONS LIST

Patent Literature

[PTL 1] Japanese Unexamined Patent Publication No. 2007-2390

SUMMARY OF INVENTION

Technical Problem

However, in the feeding path of the fiber bundle from the storage container to the driving roller, it is required to correct twisting of the fiber bundle and to stabilize manufacturing process. Also, in the feeding path of the fiber bindle from the driving roller to the opening step, it is required to pre-open the fiber bundle and to speed-up the opening step.

Thus, it is an object of the present invention to provide a method and apparatus for manufacturing a cleaning member comprising an opened fiber bundle, which can correct twisting of the fiber bundle in the feeding path of the fiber bundle from a storage container to the driving roller and thus stabilize the manufacturing process, and can pre-open the fiber bundle in the feeding path of the fiber bundle from the driving roller to the opening step and thereby speed-up the opening step.

SOLUTION TO PROBLEM

In order to solve the above problem, in accordance with the present invention, there is provided a method for manufacturing a cleaning member comprising an opened fiber bundle, the method comprising steps of:
(a) winding a fiber bundle that is continuously drawn out from a storage container in a first direction onto a first non-rotational bar provided in a direction intersecting the first direction and feeding the fiber bundle in a second direction different from the first direction and thereafter feeding it to a first driving roller;
(b) winding the fiber bundle fed in a third direction from the first driving roller onto a second non-rotational bar provided in a direction intersecting the third direction and feeding the fiber bundle in a fourth direction different from the third direction, and thereafter, feeding the fiber bundle to a second driving roller; and
(c) opening the fiber bundle fed from the second driving roller.

Also, in accordance with the present invention, there is provided an apparatus for manufacturing a cleaning member comprising an opened fiber bundle, the apparatus comprising: a first driving roller, a second driving roller, a first fiber bundle feeding unit for feeding the fiber bundle drawn out continuously from a storage container to the first driving roller, a second fiber bundle feeding unit for feeding the fiber bundle fed from the first driving roller to the second driving roller, and a fiber bundle opening unit for opening the fiber bundle fed from the second driving roller, wherein the first fiber bundle feeding unit winds the fiber bundle continuously drawn out from the storage container in a first direction onto a first non-rotational bar provided in a direction intersecting the first direction and feeds it in a second direction different from the first direction, and thereafter, feeds it to the first driving roller, and wherein the second fiber bundle feeding unit winds the fiber bundle fed from the first driving roller in a third direction onto a second non-rotational bar provided in a direction intersecting the third direction and feeds it in a fourth direction different from the third direction, and thereafter, feeds it to the second driving roller.

In the method and apparatus of the present invention, the expression "feeds it in a second direction, and thereafter, feeds it to the first driving roller" includes, in addition to the case where the fiber bundle fed in a second direction is directly fed to the first driving roller, the case where the fiber bundle fed in a second direction is wound onto one or plural non-rotational bars to change feeding direction, and thereafter, is fed to the first driving roller. Similarly, the expression "feeds it in a fourth direction, and thereafter, feeds it to the second driving roller" includes, in addition to the case where the fiber bundle fed in a fourth direction is directly fed to the second driving roller, the case where the fiber bundle fed in a fourth direction is wound onto one or plural non-rotational bars to change feeding direction, and thereafter, is fed to the second driving roller.

EFFECT OF INVENTION

In accordance with the present invention, a method and apparatus for manufacturing a cleaning member comprising an opened fiber bundle, which can correct twisting of fiber bundle in the path for feeding the fiber bundle from the storage container to the driving roller and can thereby stabilize manufacturing process, and can pre-open the fiber bundle in the path for feeding the fiber bundle from the driving roller to the opening step and can thereby speed-up the opening step.

DESCRIPTION OF EMBODIMENTS

The method and the apparatus of the present invention will be described in detail below.

The method according to aspect 1 is a method for manufacturing a cleaning member comprising an opened fiber bundle, the method comprising steps of:
(a) winding a fiber bundle that is continuously drawn out from a storage container in a first direction onto a first non-rotational bar provided in a direction intersecting the first direction, and feeding the fiber bundle in a second direction different from the first direction, and thereafter, feeding it to a first driving roller;
(b) winding the fiber bundle fed in a third direction from the first driving roller onto a second non-rotational bar provided in a direction intersecting the third direction, and feeding the fiber bundle in a fourth direction different from the third direction, and thereafter, feeding the fiber bundle to a second driving roller; and
(c) opening the fiber bundle fed from the second driving roller.

In accordance with the method according to aspect 1, in the path for feeding fiber bundle from the storage container to the first driving roller, twisting of the fiber bundle can be corrected and manufacturing process can be thereby stabilized, and in the path for feeding the fiber bundle from the first driving roller to the second driving roller and then to the opening step, the fiber bundle can be pre-opened and the opening step can be thereby carried out in higher speed.

In the method according to aspect 1, preferably, tension of the fiber bundle fed in the second direction is larger than tension of the fiber bundle fed in the first direction, and tension of the fiber bundle fed in the fourth direction is larger than tension of the fiber bundle fed in the third direction (aspect 2). In accordance with the method according to aspect 2, beneficial effect of correcting the twisting of the fiber bundle and effect of pre-opening of the fiber bundle can be increased.

In the method according to aspect 1 or 2, preferably, the first direction is a vertically upward direction (aspect 3). In accordance with the method according to aspect 3, twisting of the fiber bundle can be corrected by the dead weight of fiber bundle.

In the method according to any one of aspects 1 to 3, the fiber bundle drawn out from the storage container is preferably wound onto the first non-rotational bar after being drawn out for 3 to 5 m from the storage container (aspect 4). In accordance with the method according to aspect 4, twisting of the fiber bundle drawn out from the storage container can be corrected by the dead weight of the fiber bundle while avoiding lowering of strength of the fiber bundle due to opening, and avoiding lowering of transportability associated with this lowering.

The method according to any one of aspects 1 to 4 may include other steps in addition to steps (a) to (c). Other step may be suitably chosen in accordance with the constructions of a cleaning member to be manufactured. Other steps may be, for example, a step of attaching an oil agent to the fiber bundle, a step of stacking the fiber bundle on one, two or more members (for example, belt-shaped non-woven fabric) to form a multilayer web, a step of fixing (for example heat sealing, ultrasonic sealing, etc.) the fiber bundle included in the multilayer web to other members, a step of cutting out individual cleaning members from the multilayer web, and the like, and the method according to any one of aspects 1 to 4 may include one, two or more of these steps. In this case, the order of carrying out each step is not particularly limited as long as manufacture of the cleaning member is not hampered, and different steps may be carried out at different time or at the same time. For example, when the method according to any one of aspects 1 to 4 includes a step of attaching an oil agent to the fiber bundle, this step may be carried out during the opening step or after the opening step.

The apparatus according to aspect 1 is a manufacturing apparatus for manufacturing a cleaning member comprising an opened fiber bundle, the apparatus comprising a first driving roller, a second driving roller, a first fiber bundle feeding unit for feeding a fiber bundle continuously drawn out from a storage container to the first driving roller, a second fiber bundle feeding unit for feeding the fiber bundle fed from the first driving roller to the second driving roller, and a fiber bundle opening unit for opening the fiber bundle fed from the second driving roller, wherein the first fiber bundle feeding unit winds the fiber bundle continuously drawn out from the storage container in a first direction onto a first non-rotational bar provided in a direction intersecting the first direction, and after feeding in a second direction different from the first direction, feeds it to the first driving roller, and wherein the second fiber bundle feeding unit winds the fiber bundle fed from the first driving roller in a third direction onto a second non-rotational bar provided in a direction different from the third direction, and after feeding it in a fourth direction different from the third direction, feeds it to the second driving roller.

In accordance with the apparatus according to aspect 1, twisting of the fiber bundle can be corrected in the path for feeding the fiber bundle from the storage container to the first driving roller and can thereby stabilize manufacturing process, and the fiber bundle can be pre-opened in the path for feeding the fiber bundle from the first driving roller to the second driving roller and then to the opening step, so that the opening step can be carried out in increase speed.

In the apparatus according to aspect 1, preferably, the first fiber bundle feeding unit imparts tension to the fiber bundle fed in the second direction that is larger than tension of the fiber bundle fed in the first direction, and the second fiber bundle feeding unit imparts tension to the fiber bundle fed in the fourth direction that is larger than tension of the fiber bundle fed in the third direction (aspect 2). In accordance with the apparatus according to aspect 2, effect of correcting the twisting of the fiber bundle and effect of pre-opening can be improved.

In the apparatus according to aspect 1 or 2, preferably, the first direction is a vertically upward direction (aspect 3). In accordance with the apparatus according to aspect 3, twisting of fiber bundle drawn out from the storage container can be corrected by the dead weight of the fiber bundle.

In the apparatus according to any one of aspects 1 to 3, the fiber bundle drawn out from the storage container is preferably wound onto the first non-rotational bar after being drawn out for 3 to 5 m from the storage container (aspect 4). In accordance with the apparatus according to aspect 4, twisting of fiber bundle drawn out from the storage container can be corrected by the dead weight of fiber bundle while avoiding lowering of strength of the fiber bundle due to opening and lowering of transportability associated with this.

The apparatus according to any one of aspects 1 to 4, may include other constructs. Other constructs may be suitably chosen in accordance with the constructs of the cleaning member to be manufactured. Other construction may be, for example, an oil agent application unit for applying an oil agent to the fiber bundle, a forming device for stacking the fiber bundle on one, two or more other members (for example, belt-shaped non-woven fabric) to form a multilayer web, a fixing unit for fixing (for example, heat sealing, ultrasonic sealing, etc.) the fiber bundle and other members included in the multilayer web, a cutting unit for cutting out individual cleaning members from the multilayer web, and the like. The apparatus according to aspect 1 to 4 may include one, two or more of these constructs.

The cleaning member manufactured by the method and apparatus according to the present invention is not particularly limited. As the cleaning member manufactured by the method and apparatus according to the present invention, the cleaning member 1 shown in FIGS. 1 to 3 may be mentioned.

An embodiment of the method and apparatus according to the present invention will be described below by taking the case of manufacturing the cleaning member 1 as an example.

First, the cleaning member 1 will be described with reference to FIGS. 1 to 3.

Figure 1:
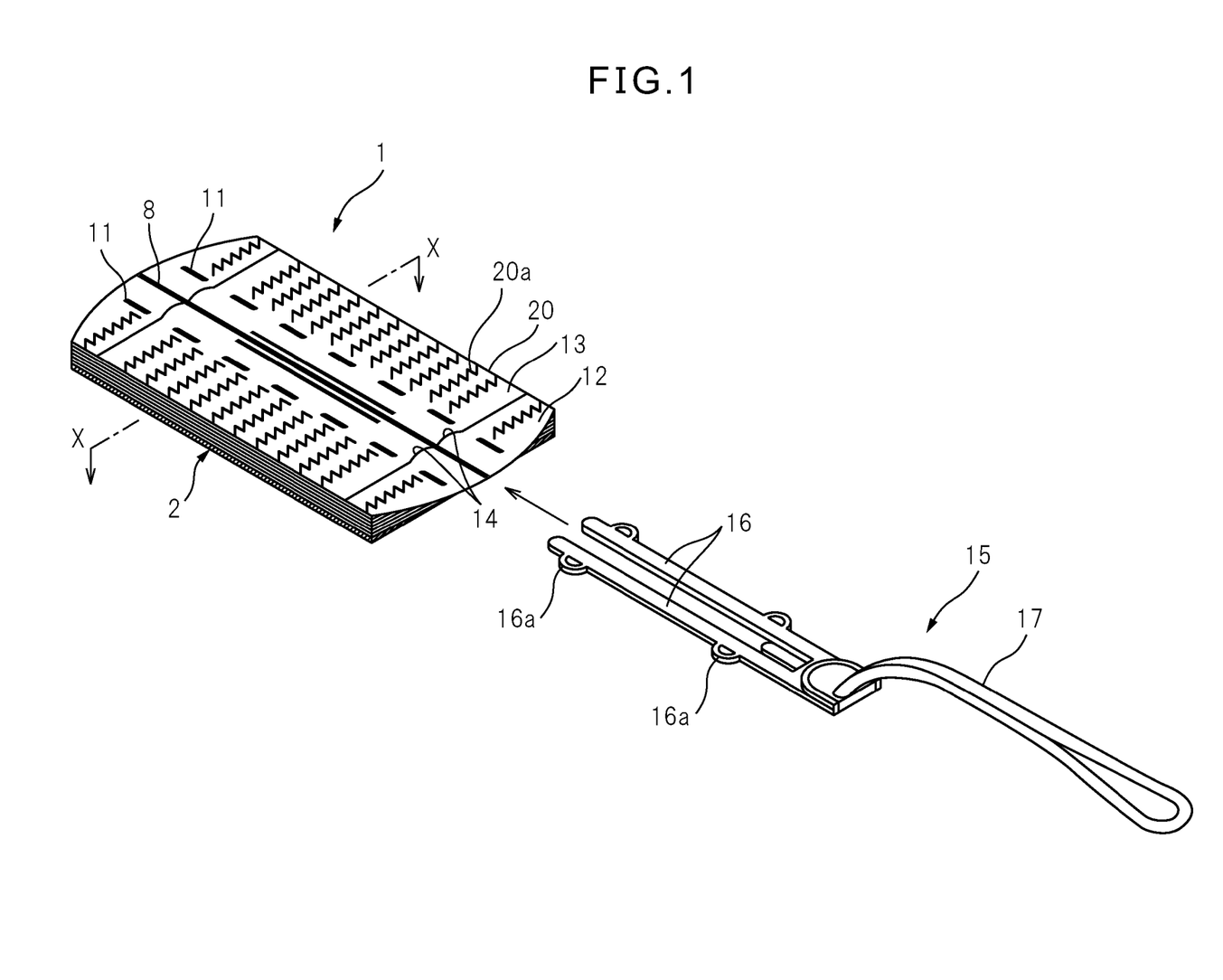
FIG. 1 is a perspective view showing a cleaning member and a holder fixed to the cleaning member manufactured according to an embodiment of the method and the apparatus of the present invention.
Figure 2:
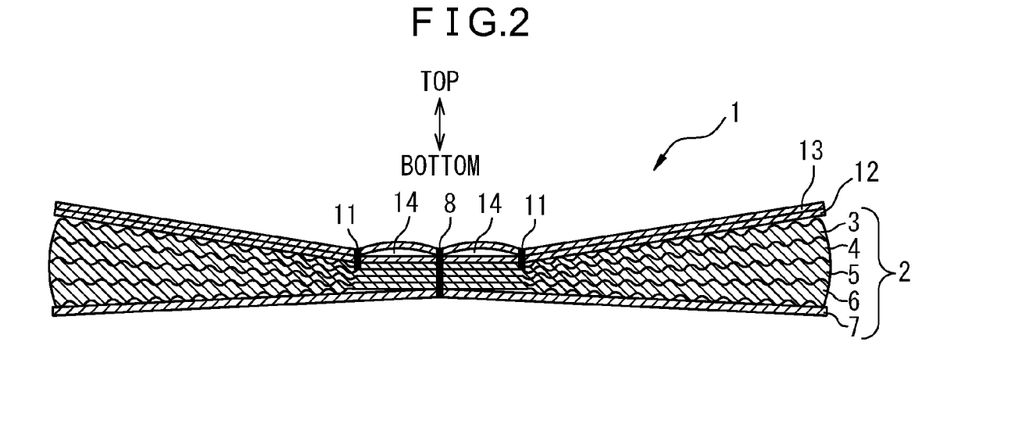
FIG. 2 is a sectional view taken along the line X-X of FIG. 1.
Figure 3:
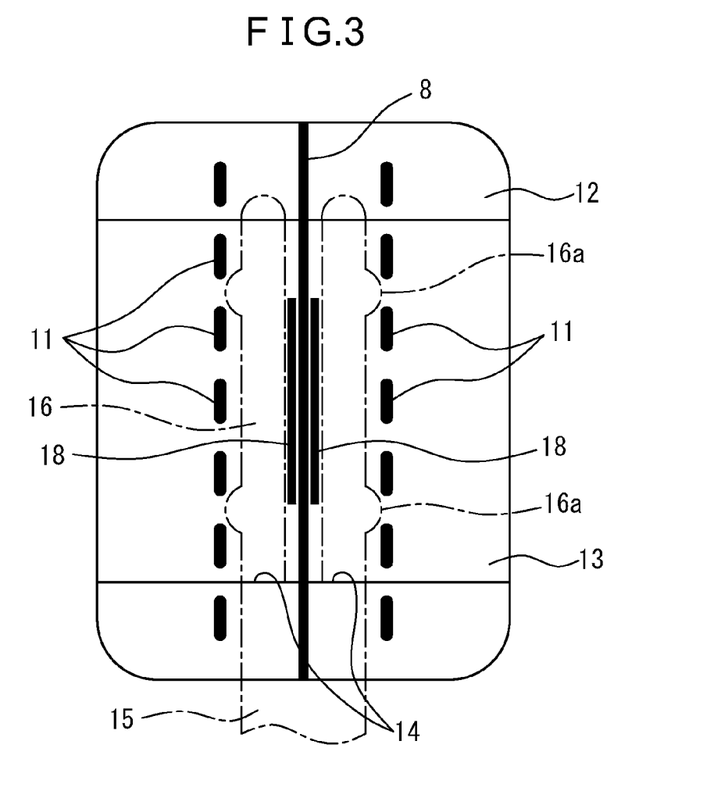
FIG. 3 is a plan view of the cleaning member shown in FIG. 1.

FIG. 1 is a perspective view showing the cleaning member 1 and the holder 15 fixed to the cleaning member 1, FIG. 2 is a sectional view taken along the line X-X of FIG. 1, and FIG. 3 is a plan view of the cleaning member 1 shown in FIG. 1. In the description that follows, "up" and "down" in FIG. 2 may refer to upper side and lower side, respectively, but "up" and "down" in FIG. 2 is used only for convenience of description, and not necessarily limit the upward and downward direction.

As shown in FIGS. 1 to 3, the cleaning member 1 comprises a brush part 2, a substrate sheet 12 stacked on the brush part 2, and a holding sheet 13 stacked on the substrate sheet 12.

As shown in FIGS. 1 to 3, in the cleaning member 1, a receiving part 14 is formed between the substrate sheet 12 and the holder sheet 13 to receive an insertion part 16 of the holder 15. As shown in FIGS. 1 to 3, the cleaning member 1 has two receiving parts formed for inserting the insertion part 16 having two branches. In the present embodiment, the number of receiving parts is two. However, the number of receiving parts may be suitably selected in accordance with the number of branches of the insertion part. In other embodiment, the number of receiving parts may be three or more.

As shown in FIG. 2, the brush part 2 comprises four layers of fibrous members consisting of a first fibrous member 3, a second fibrous member 4 stacked on the underside of the first fibrous member 3, a third fibrous member 5 stacked on the underside of the second fibrous member 4, and a fourth fibrous member 6 stacked on the underside of the third fibrous member 5, and a sheet with slits 7 stacked on the underside of this four layer structure (on the underside of the fourth fibrous member 6). Although the fibrous members of the brush part 2 have four-layered structure in the present embodiment, layered structure of the fibrous members may be suitably selected. In other embodiment, layered structure of the fibrous members may be monolayered structure, two-layered structure or three-layered structure. In still other embodiment, layered structure of the fibrous members may be five- or-more-layered structure. Also, in the present embodiment, the brush part 2 comprises a sheet with slits 7. However, presence or absence of the sheet with slits 7 may be suitably chosen. In other embodiment, the sheet with slits 7 may be omitted.

The first to fourth fibrous members 3 to 6 are fiber bundle having an oil agent attached thereto. The oil agent in the present embodiment is a dust-collecting oil agent (such as an oil agent having liquid paraffin as a main component) that exhibits promoting effect for adsorbing dust and dirt. The amount of oil agent per cleaning member is usually 0.05 to 2 g/piece, preferably 0.1 to 1 g/piece, more preferably 0.2 to 0.5 g/piece. If the amount of oil agent is less than 0.05 g/piece, capability for holding dust and dirt may be degraded, and if the amount exceeds 2 g/piece, the oil agent may adhere to an object to be cleaned (for example, furniture and the like).

Components of the dust collecting oil agent are not particularly limited, and include mineral oils, synthetic oils, silicone oils, surface active agents and the like. Mineral oils may be paraffinic hydrocarbons, naphthenic hydrocarbons, aromatic hydrocarbons, etc. Synthetic oils may be, for example, alkyl benzene oils, polyolefin oils, polyglycol oils, etc. Silicone oils may be, for example, chain dimethyl polysiloxane, ring dimethyl polysiloxane, methyl hydrodiene polysiloxane, various modified silicones, etc. Surface active agents may be, for example, cationic surface active agents such as quaternary ammonium salt type surfactant, non-ionic surface active agents such as polyethylene glycol type surfactants, polyalcohol type surfactants, etc.

If the dust collecting oil agent is an oil agent having liquid paraffin as a main component, viscosity of the oil agent is preferably in the range of 108 to 128 mm$^2$/S. This viscosity is the viscosity as measured by Ubbelohde method (30° C.) carried out using an Ubbelohde viscometer (defined in JIS K 2839-1980 with coefficient determined in SIS B-0017), a thermometer (as defined in JIS B7410-1982 for dynamic viscosity measurement) and a thermostat (as defined in JIS K2283-1983).

The fiber bundle may be, for example, TOW, preferably opened TOW. "TOW" means a bundle of a large number of filaments as described in JIS L 0204-3:1998 3.1.24.

The fiber bundle may be a bundle of slit fibers (fibers formed by cutting a film in elongated form and extending them), split fibers (fibers formed by splitting an elongated film into network segments), or the like.

As the fiber bundle, a fiber bundle composed of thermoplastic fiber, fiber bundle containing thermoplastic fiber, etc., may be mentioned. Raw material of the fiber forming the fiber bundle may be, for example, polyethylene, polypropylene, polyethylene terephthalate, nylon, rayon, etc. Type of the fiber forming the fiber bundle may be, for example, single fiber, composite fiber (for example, core-sheath type composite fiber, side-by-side type composite fiber). Preferably, in view of thermal bondability, composite fiber is core-sheath type composite fiber with melting point of core higher than melting point of sheath.

As preferred core-sheath type composite fiber, core-sheath type composite fiber with core composed of polypropylene or polyethylene terephthalate and sheath composed of polyethylene may be mentioned, and more preferably core-sheath type composite fiber with core composed of polyethylene terephthalate and sheath composed of polyethylene may be mentioned.

Fineness of the fiber forming the fiber bundle is preferably 1 to 50 dtex, and more preferably 2 to 10 dtex. The fiber bundle may contain plural types of fiber having same fineness, or may contain single or plural types of fiber having different fineness.

In the present embodiment, each fiber composing the fiber bundle is formed as crimped fiber. By forming each fiber as crimped fiber, the fiber bundle can be constructed in bulky form, and can have structure suitable for adsorbing dust and dirt in the crimped portion. In other embodiment, each fiber composing the fiber bundle may be formed as non-crimped fiber.

As will be described later, the sheet with slits 7 is formed of non-woven fabric of thermoplastic fiber (heat adhesive fiber) or non-woven fabric containing thermoplastic fiber, just like the substrate sheet 12 and the holding sheet 13, and is formed in rectangular shape of generally same width and generally same length as the substrate sheet 12. The sheet with slits 7 is provided with incisions (not shown) in the shape of saw tooth at a prescribed separation over the entire length of the sheet with slits 7. With these incisions, reed-shaped parts having the shape of saw tooth on both edges along the entire length at both edges in width direction of the sheet with slits 7 are formed (not shown).

As shown in FIGS. 1 to 3, the substrate sheet 12 and the holding sheet 13 are stacked in this order on the upper side of the first fibrous member 3 of the brush part 2, and the receiving part 14 for inserting the insertion part 16 of the holder 15 is formed between the substrate sheet 12 and the holding sheet 13.

As shown in FIG. 3, the substrate sheet 12 and the holding sheet 13 have both rectangular shapes, such that both sheets 12, 13 are set so as to have same dimension in width direction (left-right direction in FIG. 3). Dimension in length direction (up-down direction in FIG. 3) of the substrate sheet 12 is set to be larger than the holding sheet 13, and the holding sheet 13 is stacked on the substrate sheet 12 such that both longitudinal ends of the substrate sheet 12 project outward by a prescribed length from both longitudinal ends of the holding sheet 13.

The substrate sheet 12 and the holding sheet 13 are formed from non-woven fabric composed of thermoplastic fiber (heat fused fiber) or non-woven fabric containing thermoplastic fiber. As the thermoplastic fiber, for example, polyethylene fiber, polyethylene terephthalate fiber, composite fiber composed of polyethylene fiber and polyethylene terephthalate fiber, composite fiber composed of polyethylene fiber and polypropylene fiber, and core-sheath type composite fiber with the core composed of polyethylene terephthalate and the sheath composed of polyethylene, for example, may be mentioned. Type of the non-woven fabric may be, for example, thermal bond non-woven fabric, spunbonded non-woven fabric, spunlace non-woven fabric, etc.

In other embodiment, the substrate sheet and the holding sheet are formed of thermoplastic resin film, for example, polyethylene film, polypropylene film. In still other embodiment, the substrate sheet and the holding sheet are formed from laminate sheet of non-woven fabric and resin film.

The substrate sheet 12 and the holding sheet 13 are melt bonded in one unit to all layers of the brush part 2 (the first fibrous member 3, the second fibrous member 4, the third fibrous member 5, the fourth fibrous member 6, and the sheet with slits 7) by a first melt bonded part forming device 158 to be described later, and as shown in FIGS. 1 to 3, in the cleaning member 1, a first melt bonded part 8 extending in longitudinal direction is formed in center portion in width direction. Further, the substrate sheet 12 and the holding sheet 13 are melt bonded on both sides (on the left and the right) of the first melt bonded part 8 to one layer (the first fibrous member 3) by a second melt bonded part forming device 134, and two second melt bonded parts 11 are formed in longitudinal direction in the cleaning member 1. Two second melt bonded parts 11 are intermittently formed, respectively. By fusion of the first fibrous member 3 to the substrate sheet 12 and the holding sheet 13, the first fibrous member 3 follows the movement of these sheets 12, 13, so that the brush part 2 is more easily expanded at the time of usage, and cleaning efficiency can be thereby improved.

The substrate sheet 12 and the holding sheet 13 are melt bonded to all layers of the brush part 2 (the first fibrous member 3, the second fibrous member 4, the third fibrous member 5, the fourth fibrous member 6, and the sheet with slits 7) at the first melt bonded part 8, and are further melt bonded to the first fibrous member 3 of the brush part 2 at the two second melt bonded parts 11. Thus, a pair of receiving parts 14 is formed between the substrate sheet 12 and the holding sheet 13 as a bag-shaped space that is delimited by the first melt bonded part 8 and the two second melt bonded parts 11, extends in longitudinal direction of the substrate sheet 12 and the holding sheet 13 and opens at both longitudinal ends, so that the insertion part 16 of the holder 15 can be inserted in the receiving part 14.

The substrate sheet 12 and the holding sheet 13 are melt bonded to the first fibrous member 3 of the brush part 2 at center portion thereof by the second fusion forming device 134 to be described later, and as shown in FIG. 3, a pair of melt bonding lines 18 is formed in the cleaning member 1 at a prescribed separation in width direction of the substrate sheet 12 and the holding sheet 13, and the first melt bonded part 8 is formed between the pair of melt bonding lines 18. The pair of melt bonding lines 18 is a mark for controlling the position of the first melt bonded part 8 in manufacture stage, and by controlling whether or not the first melt bonded part 8 is situated between the pair of heat melt bonding lines 18, selection between defective and non-defective product can be carried out.

As shown in FIGS. 1 to 3, two second melt bonded parts 11 are provided intermittently in longitudinal direction of the substrate sheet 12 and the holding sheet 13, and by engaging circular arc-shaped protrusion 16a of each insertion part 16 of the holder 15 with the non-fusion portion of the two second melt bonded parts 11, each insertion part 16 of the holder 15 is prevented from slipping out of each receiving part 14.

As shown in FIG. 1, incisions 20a in the shape of saw tooth are provided at a prescribed separation along longitudinal direction on both edge portions (portions outside of two second melt bonded parts 11) in width direction of the substrate sheet 12 and the holding sheet 13, and with these incisions 20a, plural reed-shaped parts 20 with both edges in the shape of saw tooth are provided. In other embodiment, incisions 20a in the shape of saw tooth are provided in the substrate sheet 12 and the holding sheet 13, and therefore, no reed-shaped part 20 is formed.

As shown in FIG. 1, the holder 15 has a pair of insertion parts 16 in the shape of rectangular plate arranged in parallel to each other, a pair of circular arc-shaped protrusions 16a projecting from outer side of both longitudinal ends of each insertion part 16, and a holder part 17 integrally provided on one end of the insertion part 16, and is formed from, for example, plastic and the like.

By inserting both insertion parts 16 of the holder 15 into both receiving parts 14 of the cleaning member 1 and engaging the protrusions 16a with the non-fusion portion of the two second melt bonded parts 11, the cleaning member 1 is mounted to the holder 15. By holding the holder part 17 of the holder 15 and bringing the brush part 2 into contact with the point to be cleaned and moving it in desired direction, dust and dirt at the location to be cleaned are captured by the brush part 2 and the location to be cleaned is cleaned.

Next, an embodiment of the method and apparatus for manufacturing a cleaning member 1 will be described with reference to FIGS. 4 and 5.

Figure 4:
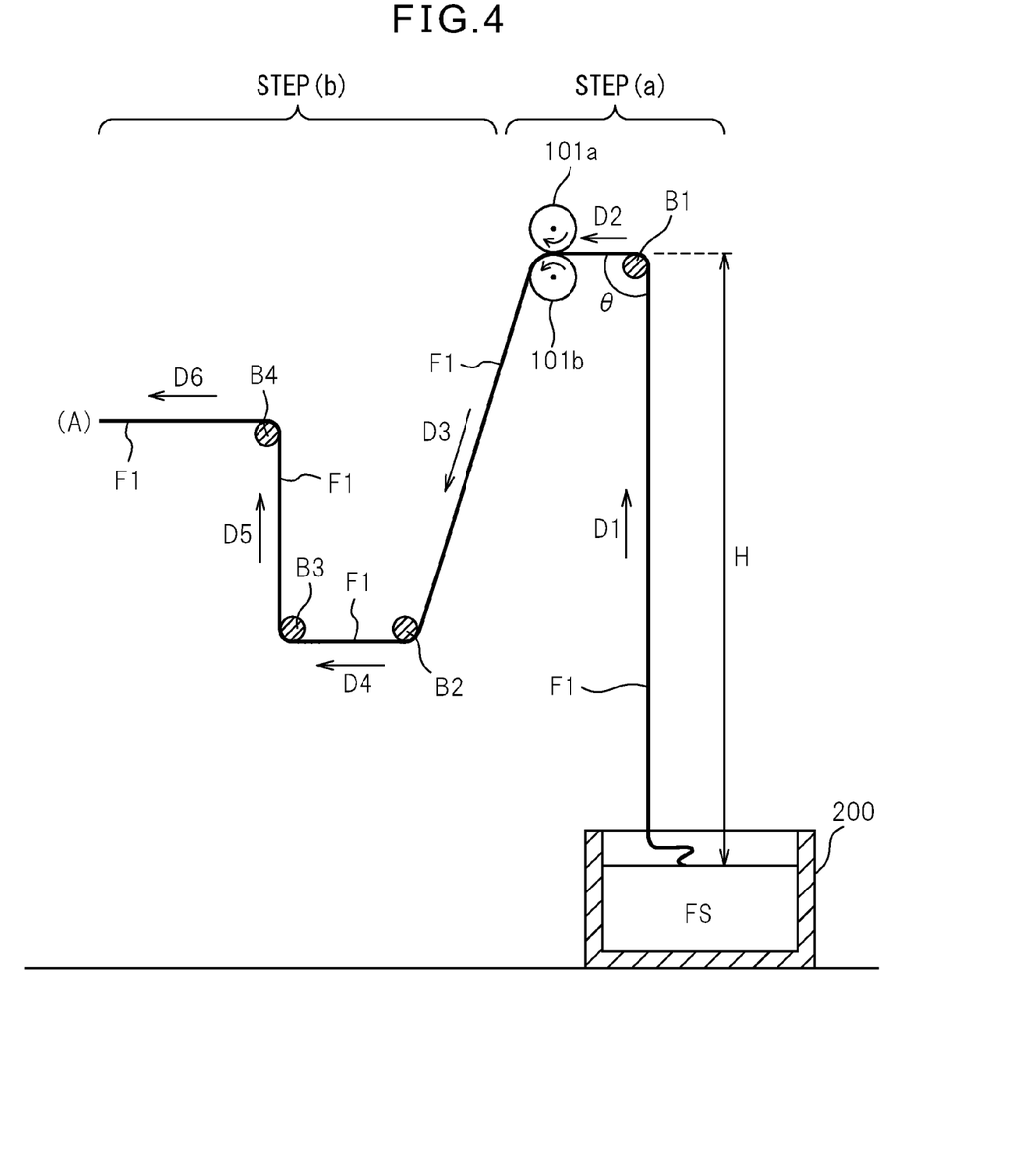
FIG. 4 is a partial sectional view useful for explaining manufacturing process for manufacturing the cleaning member shown in FIG. 1, in particular, the step of feeding fiber bundle from a storage container to the driving roller and the step of feeding the fiber bundle from the driving roller to the opening step.
Figure 5:
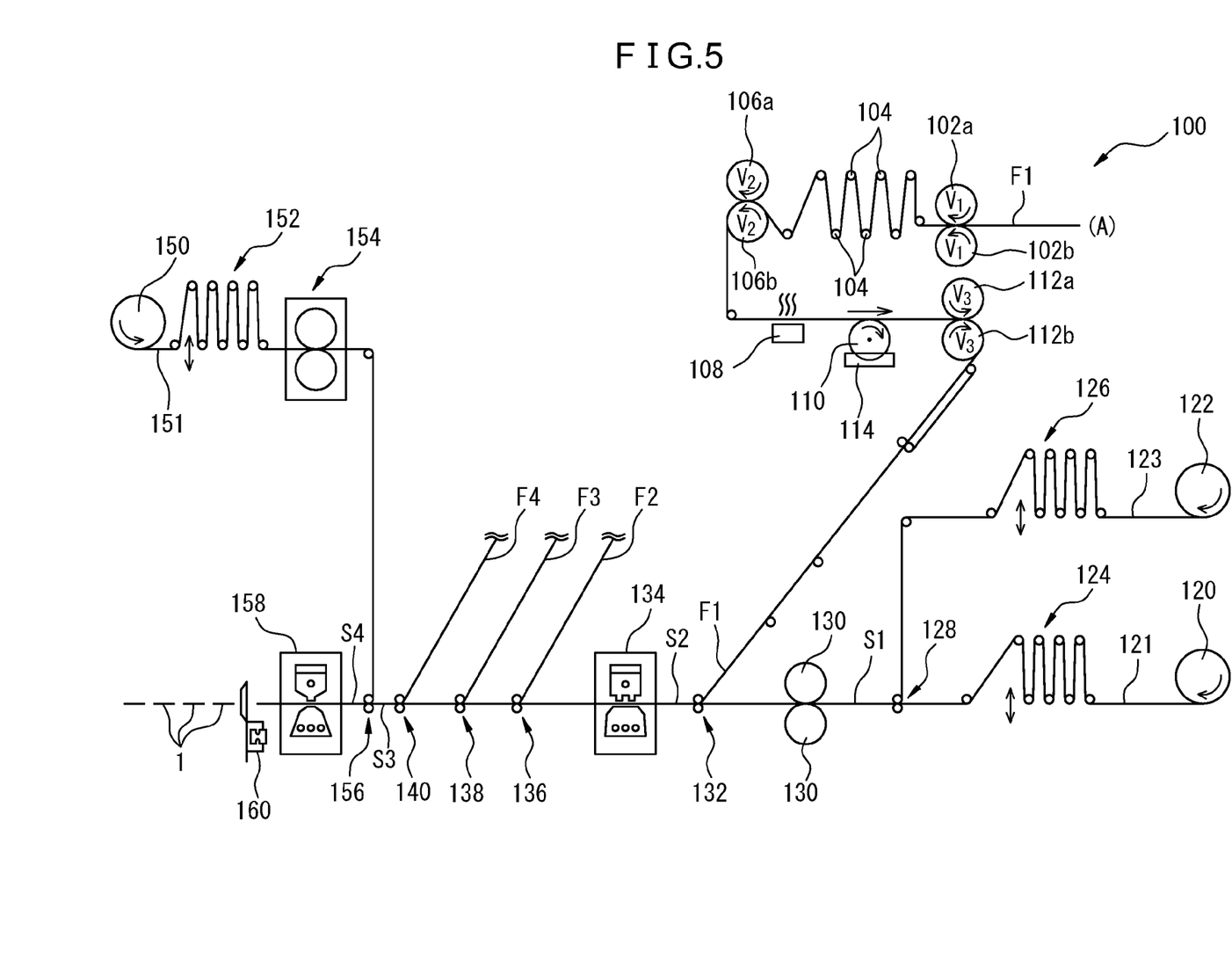
FIG. 5 is a schematic view useful for explaining manufacturing process for manufacturing the cleaning member shown in FIG. 1, in particular, the opening step and thereafter.

FIGS. 4 and 5 are schematic views useful for explaining the method and apparatus for manufacturing a cleaning member 1, and (A) in FIG. 4 is followed by (A) in FIG. 5. FIG. 4 is a partially sectional view useful for explaining manufacturing process for manufacturing the cleaning member 1, in particular, the steps of feeding the fiber bundle from the storage container to the first driving roller, and feeding the fiber bundle from the first driving roller to the second driving roller and to the opening step, and FIG. 5 is a schematic view useful for explaining manufacturing process for manufacturing the cleaning member 1, in particular, steps after the opening step. Steps after the opening step are carried out by using the apparatus 100 shown in FIG. 5.

In the present embodiment, the method for manufacturing a cleaning member 1 comprises the following steps (a) to (c):
(a) winding the fiber bundle continuously drawn out from the storage container in the first direction onto a first non-rotational bar provided in a direction intersecting the first direction, and after feeding it in a second direction different from the first direction, feeding it to a first driving roller;
(b) winding the fiber bundle fed from the first driving roller in a third direction onto a second non-rotational bar provided in a direction intersecting the third direction, and after feeding it in the fourth direction different from the third direction, feeding it to a second driving roller; and
(c) opening the fiber bundle fed from the second driving roller.

<Step (a) and Step (b)>

Steps (a) and (b) will be described below with the first fiber bundle F1 taken as an example. The steps are similarly carried out with other fiber bundles (the second fiber bundle F2 to the fourth fiber bundle F4).

As shown in FIG. 4, in step (a), the fiber bundle F1 drawn out continuously from the storage container 200 in a first direction D1 is wound onto a first non-rotational bar B1 provided in a direction intersecting the first direction D1 (in the present embodiment, in a direction orthogonal to the first direction D1), and after the fiber bundle is fed in a second direction D2 different from the first direction D1, the fiber bundle is fed to feed roller 101a, 101b (an example of the first driving roller);

In the present embodiment, the number of non-rotational bar used in step (a) is 1. However, the number of non-rotational bar may be suitably selected. In other embodiment, the number of non-rotational bars may be two or more. If the number of non-rotational bars is two or more, the fiber bundle F1 drawn out from the storage container 200 is wound successively onto two or more non-rotational bars to change direction each time and then is fed to the feed roller 101a, 101b.

As shown in FIG. 4, in step (b), the fiber bundle F1 fed from the feed roller 101a, 101b (an example of the first driving roller) in the third direction D3 is wound onto a second non-rotational bar B2 provided in a direction intersecting the third direction D3 (in the present embodiment, a direction orthogonal to the third direction D3), and after it is fed in a fourth direction D4 different from the third direction, it is fed to nip rollers 102a, 102b (an example of the second driving roller).

In the present embodiment, as shown in FIG. 4, the fiber bundle F1 fed in the fourth direction D4 is wound onto a third non-rotational bar B3 provided in a direction intersecting the fourth direction D4 (in the present embodiment, a direction orthogonal to the fourth direction D4) and is fed in a fifth direction D5 different from the fourth direction D4, and then, the fiber bundle F1 is wound onto a fourth non-rotational bar B4 provided in a direction intersecting the fifth direction D5 (in the present embodiment, a direction orthogonal to the fourth direction D5) and after being fed in a sixth direction D6 different from the fifth direction D5, is fed to the nip rollers 102a, 102b (an example of the second driving rollers).

In the present embodiment, the number of non-rotational bars is 3, but the number of non-rotational bars may be suitably selected. In other embodiment, the number of non-rotational bars may be 1 or 2. In still other embodiment, the number of non-rotational bars may be 4 or more. When the number of non-rotational bars is 2 or more, the fiber bundle F1 fed from the feed rollers 101a, 101b (an example of the first driving rollers) in the third direction D3 is wound successively onto two or more non-rotational bars to change direction and then is fed to nip rollers 102a, 102b (an example of the second driving rollers) shown in FIG. 5.

The first non-rotational bar B1 to the fourth non-rotational bar B4 are respectively fixed and supported at both ends so as not to be rotated. In the present embodiment, the first non-rotational bar B1 to the fourth non-rotational bar B4 respectively extend in a direction orthogonal to the feeding direction of the fiber bundle F1.

A diameter, interval, number, coefficient of friction, etc. of the first non-rotational bar B1 to the fourth non-rotational bar B4 may be suitably adjusted in accordance with tension to be imparted to the fiber bundle F1. A diameter, coefficient of friction, etc. of the first non-rotational bar B1 to the fourth non-rotational bar B4 may be same or may be different.

In the present embodiment, the first non-rotational bar B1 to the fourth non-rotational bar B4 are circular in sectional view. However, shape of the non-rotational bar is not particularly limited as long as the fiber bundle can be wound onto it, and may be suitably selected. In other embodiment, at least the portion of the non-rotational bar on which the fiber bundle is to be wound has the shape of circular arc in sectional view. In still other embodiment, the non-rotational bar has the shape of an ellipse in sectional view, and in still other embodiment the non-rotational bar has the shape of a polygon in sectional view.

As shown in FIG. 4, the storage container 200 stores original fabric FS of fiber bundle F1 composed of crimped fiber, and the fiber bundle F1 is drawn out from the storage container 200, and is successively wound onto the first non-rotational bar B1 to the fourth non-rotational bar B4 to change its direction and is fed continuously. At this time, as shown in FIG. 4, the fiber bundle F1 is wound on the first non-rotational bar B1 to the fourth non-rotational bar B4 such that it strides over the non-rotational bars B1 and B4 and passes under the non-rotational bars B2 and B3.

In step (a) according to the present embodiment, in the path for feeding the fiber bundle F1 from the storage container 200 to the feed roller 101a, 101b, the fiber bundle F1 continuously drawn out from the storage container 200 is wound onto the first non-rotational bar B1 to change its feeding direction, and thereafter is fed to the feed roller 101a, 101b, whereby twisting of the fiber bundle F1 is corrected and the manufacturing process can be stabilized. In step (b) according to the present invention, in the path for feeding the fiber bundle F1 from the feed rollers 101a, 101b to the nip rollers 102a, 102b and to the following opening step, the fiber bundle F1 fed from the feed rollers 101a, 101b is successively wound onto the second non-rotational bar B2 to the fourth non-rotational bar B4 to change its feeding direction and is fed to nip rollers 102a, 102b, whereby the fiber bundle is pre-opened and the opening step can be carried out at higher speed.

By continuously feeding the fiber bundle F1 while the fiber bundle F1 is wound onto the first non-rotational bar B1 to the fourth non-rotational bar B4 to change its feeding direction, relation of the tension T1 of the fiber bundle F1 fed in the first direction D1, the tension T2 of the fiber bundle F1 fed in the second direction D2, the tension T3 of the fiber bundle F1 fed in the third direction D3, the tension T4 of the fiber bundle F1 fed in the fourth direction D4, the tension T5 of the fiber bundle F1 fed in the fifth direction D5, and the tension T6 of the fiber bundle F1 fed in the sixth direction D6 can be adjusted such that T1<T2<T3<T4<T5<T& holds. With this difference of tensions, effect of correcting twisting of the fiber bundle F1 and effect of pre-opening step can be improved.

As shown in FIG. 4, the fiber bundle before and after it is wound onto the first non-rotational bar B1 makes an angle θ, and in order to correct twisting of the fiber bundle F1 effectively, the angle θ is preferably 90° or less. The angle of the fiber bundle F1 before and after it is wound onto other non-rotational bar can be suitably adjusted in order to impart desired tension to the fiber bundle F1 to pre-open the fiber bundle.

In the present embodiment, the first direction D1 is vertically upward direction. With this construction, twisting of the fiber bundle F1 can be corrected by the dead weight of the fiber bundle F1.

As shown in FIG. 4, the fiber bundle F1 is drawn out from the storage container 200 up to the height of H and is then wound onto the first non-rotational bar B1. The height H is preferably 3 to 5 m. By adjusting the height H to 3 to 5 m, while avoiding lowering of strength of the fiber bundle F1 due to opening and lowering of transportability associated with this, twisting of the fiber bundle F1 drawn out from the storage container 200 can be corrected by the dead weight of the fiber bundle F1. If the height H is less than 3 m, twisting of the fiber bundle F1 may not be sufficiently corrected, and if the height H exceeds 5 m, lowering of strength of the fiber bundle F1 due to opening and lowering of transportability associated with this may result.

<Step (c)>

Step (c) will be described below with the fiber bundle F1 taken as an example. With other fiber bundles (the second fiber bundle F2 to the fourth fiber bundle F4), step (c) can be carried out similarly.

As shown in FIG. 5, the fiber bundle F1 is fed to the first nip rollers 102a, 102b rotating at a constant peripheral velocity V1. The fiber bundle F1 that has passed the first nip rollers 102a, 102b passes through plural tension rollers 104 to be fed to the second nip rollers 106a, 106b rotating at a constant peripheral velocity V2.

The peripheral velocity V2 of the second nip rollers 106a, 106b is higher than the peripheral velocity V1 of the first nip rollers 102a, 102b. Owing to this difference between the peripheral velocities, tension is imparted to the fiber bundle F1 between the first nip rollers 102a, 102b and the second nip rollers 106a, 106b, and as a result, the fiber bundle F1 is opened.

Each tension roller 104 is formed from, for example, solid steel, and the mass is adjusted such that significant force is required for its rotation. Thus, when the fiber bundle F1 advances from the first nip rollers 102a, 102b to the second nip rollers 106a, 106b while rotating each tension roller, speed of movement of the fiber bundle F1 is not increased suddenly.

In order to be able to open the fiber bundle F1 gradually, Each tension roller 104 is arranged such that the distance between the first nip rollers 102a, 102b and the second nip rollers 106a, 106b is sufficiently long.

As shown in FIG. 5, the fiber bundle F1 that has passed the second nip rollers 106a, 106b passes the air supplying device 108 and is fed to the third nip rollers 112a, 112b rotating at the peripheral velocity V3. The peripheral velocity V3 of the third nip rollers 112a, 112b is lower than the peripheral velocity V2 of the second nip rollers 106a, 106b. Owing to this difference between the peripheral velocities, tension of the fiber bundle F1 is relaxed between the second nip rollers 106a, 106b and the third nip rollers 112a, 112b, and as a result, the fiber bundle F1 is further opened and the width of the fiber bundle is increased.

Air is blown by the air supplying device 108 to the fiber bundle F1 fed from the second nip rollers 106a, 106b to the third nip rollers 112a, 112b, and as a result, the fiber bundle F1 is further opened.

In the present embodiment, opening of the fiber bundle F1 is carried out by imparting and relaxing of tension and blow of air. However, method of opening the fiber bundle may be suitably changed. In other embodiment, only one of imparting and relaxing of tension and blow of air is used. In still other embodiment, other method of opening is used in addition to the imparting and relaxing of tension and blow of air. In the present embodiment, the first to third nip rollers are used to impart and relax tension. However, the number of nip rollers may be suitably changed. In other embodiment, in addition to the first to the third nip rollers, other nip rollers are used to impart and relax tension.

In the present embodiment, the method for manufacturing a cleaning member 1 comprises, in addition to steps (a) to (c), the following steps (d) and (e).

(d) A step of attaching an oil agent to the fiber bundle.
(e) A step of using the fiber bundle having the oil agent attached thereto to manufacture a continuous body of cleaning member, and cutting out cleaning member 1 from the continuous body of cleaning member.

<Step (d)>

Step (d) will be described below with the fiber bundle F1 taken as an example. With other fiber bundles (the second fiber bundle F2 to the fourth fiber bundle F4), step (d) can be carried out similarly.

Step (d) is carried out using the transfer roller 110 provided between the second nip rollers 106a, 106b and the third nip rollers 112a, 112b. In the present embodiment, step (d) is carried out between the second nip rollers 106a, 106b and the third nip rollers 112a, 112b, that is, during step (c). However, time point for carrying out step (d) may be suitably modified. In other embodiment, step (d) is carried out after step (c).

The transfer roller 110 is a roller commonly used as a roll coater, and is not particularly limited as long as film of oil agent can be formed on the surface, but is preferably a mirror surface roller. If the transfer roller is a mirror surface roller, the fiber bundle is prevented from being wound around the transfer roller 110, and a cleaning member having an oil agent uniformly attached thereto can be efficiently manufactured.

Diameter and rotational speed of the transfer roller 110 can be suitably adjusted with the feeding speed of the fiber bundle F1, etc., taken into account such that film of oil agent can be uniformly formed on the roller surface.

The transfer roller 110 is provided such that it comes in contact with the fiber bundle F1 while being rotated in the same direction as the feeding direction of the fiber bundle F1 by a driving system (not shown). The expression that rotational direction of the transfer roller 110 "is the same as the feeding direction of the fiber bundle F1" means that the direction of the tangential velocity of the portion of the transfer roller 110 contacting with the fiber bundle F1 is the same as the direction of the feeding velocity of the fiber bundle F1.

As shown in FIG. 5, an oil agent bath 114 is provided at a position upstream of the contact position of the fiber bundle F1 and the transfer roller 110 in the rotational direction of the transfer roller 110. With such construction, before a prescribed portion of the surface of the transfer roller 110 comes into contact with the fiber bundle F1, an oil agent can be applied to the prescribed portion.

The oil agent bath 114 contains an oil agent. In the present embodiment, the oil agent contained in the oil agent bath 114 is a dust collecting oil agent (for example, an oil agent having liquid paraffin as a main component) that promotes adsorption of dust, dirt or the like.

The amount of the oil agent contained in the oil agent bath 114 and position of the rotational axis of the transfer roller 110 is adjusted such that a portion of the transfer roller is dipped in the oil agent contained in the oil agent bath 114. The transfer roller 110 is rotated with a portion thereof dipped in the oil agent bath so that the oil agent is continuously applied to the surface of the transfer roller 110. The amount of the applied oil agent is adjusted such that the amount of oil agent per one cleaning member is usually 0.05 to 2 g/piece, preferably 0.1 to 1 g/piece, and more preferably 0.2 to 0.5 g/piece. If the dust collecting oil agent is an oil agent having liquid paraffin as a main component, viscosity of the oil agent is preferably 108 to 128 $mm^2/S$. This viscosity is the viscosity as measured by Ubbelohde method (30° C.) carried out using an Ubbelohde viscometer (defined in JIS K 2839-1980 with coefficient determined in SIS B-0017), a thermometer (defined in JIS B7410-1982 for dynamic viscosity measurement) and a thermostat (defined in JIS K2283-1983).

When the fiber bundle F1 continuously fed in prescribed direction by the second nip rollers 106a, 106b and the third nip rollers 112a, 112b comes into contact with the transfer roller 110 rotating in the same direction as the feeding direction of the fiber bundle F1, the oil agent applied on the surface of the transfer roller 110 is transferred to the fiber bundle F1. The fiber bundle F1 having the oil agent attached thereto is manufactured in this way. The transfer roller 110 is rotated with a portion thereof dipped in the oil agent bath 114 and with another portion in contact with the fiber bundle F1 so that the oil agent is continuously transferred to the fiber bundle F1 continuously fed in the prescribed direction.

After being processed in steps (a) to (d), the fiber bundle F1 proceeds to the confluence point 132. Similarly, the second fiber bundle F2 to the fourth fiber bundle F4 respectively proceed, after being processed in steps (a) to (d), to the confluence points 136, 138, 140.

<Step (e)>

Step (e) will be described below.

In the present embodiment, step (e) includes following steps ($e_1$) to ($e_3$).

($e_1$) Step of forming a multilayer web by stacking the fiber bundle after being processed in steps (a) to (d) onto other member (in the present embodiment, band-shaped non-woven fabric)

($e_2$) Step of fixing the fiber bundle to other member included in the multilayer web ($e_3$) Step of cutting out individual cleaning member 1.

[Step ($e_1$)]

Step ($e_1$) will be described below.

In the present embodiment, other members to be stacked to the fiber bundle are band-shaped non-woven fabrics 121, 123, 151. In other embodiment, one or two of these non-woven fabrics are stacked to the fiber bundle. In still other embodiment, in addition to these non-woven fabrics, other non-woven fabric is stacked to the fiber bundle. In any of these embodiments, although the order of superposition is not particularly limited, a non-woven fabric is preferably superimposed so as to be situated at the outermost position.

The non-woven fabrics 121, 123 correspond respectively to the substrate sheet 12 and to the holding sheet 13. The non-woven fabric 121 is continuously rolled out from the non-woven fabric roll 120 and includes plural rollers disposed in two rows, upper rollers and lower rollers, and is intermittently fed by the roll situated in lower row passing the dancer roller 124 swinging up and down. Similarly, the non-woven fabric 123 is continuously rolled out from the non-woven fabric roll 122 and includes plural rollers disposed in two rows, upper rollers and lower rollers, and is intermittently fed by the roll situated in lower row passing the dancer roller 126 swinging up and down. The expression "is intermittently fed" means that each of the non-woven fabrics 121, 123 is fed such that it advances for certain distance (for example, about the length in width direction of a cleaning member 1) in the feeding direction and then feeding is stopped for certain time period, and this is repeated. By feeding the non-woven fabrics 121, 123 intermittently in this manner, time required for fusion of the constituents of the multilayer web can be ensured, as will be described later.

The non-woven fabrics 121, 123 join at the confluence point 128 to form multilayer web S1, and the multilayer web S1 passes through a gather cutter 130 having saw tooth-shaped blade (not shown) formed intermittently in circumferential direction on its surface. With this cutter, incisions corresponding to the incisions 20a (see FIG. 1) of the substrate sheet 12 and the holding sheet 13 are formed.

The multilayer web S1 joins at the confluence point 132 to the first fiber bundle F1 after being processed in step (a) to (d), and the first fiber bundle F1 is stacked onto the multilayer web S1 to form a multilayer web S2. At this time, the construction is such that the first fiber bundle F1 can slacken to some extent between the third nip rollers 112a, 112b and the confluence point 132, and with such construction, same effect as provision of a dancer roller between them can be obtained.

The multilayer web S2 successively joins, at confluence points 136, 138, 140, to the second fiber bundle F2 to the fourth fiber bundle F4 that have been processed in steps (a) to (d), and the second fiber bundle F2 to the fourth fiber bundle F4 are successively stacked onto the multilayer web S2 to form a multilayer web S3.

The non-woven fabric 151 corresponds to the sheet with slits 7. The non-woven fabric 151 is rolled out continuously from a non-woven fabric roll 150, and by passing through a dancer roller 152, is fed intermittently and passes through a gather roller 154. The gather roller 154 has a saw tooth-shaped blade (not shown) formed continuously in circumferential direction on the surface, and with this roller, saw tooth-shaped incision (not shown) is formed in the non-woven fabric that has passed the gather roller 154.

The non-woven fabric 151 joins at the confluence point 156 to the multilayer web S3, and the non-woven fabric 151 is stacked on the multilayer web S3 to form a multilayer web S4.

[Step ($e_2$)]

Step ($e_2$) will be described below.

Before joining to the second fiber bundle F2 to the fourth fiber bundle F4, the multilayer web S2 passes the second melt bonded part forming device 134. The second melt bonded part forming device 134 fuses the non-woven fabrics 121, 123 and the first fiber bundle F1 included in the multilayer web S2, and forms two second melt bonded parts 11 (see FIG. 3). Thus, the multilayer web S2 is melt bonded through thickness direction. Although, in the present embodiment, a heat sealing device is used as the second melt bonded part forming device 134, other sealing device (for example, ultrasonic sealing device) may be used.

The multilayer web S4 passes the first melt bonded part forming device 158. The first melt bonded part forming device 158 fuses the entire multilayer web S4 and forms the first melt bonded part 8 in the multilayer web S4 (see FIG. 3). With this fusion, the multilayer web S4 is melt bonded through its thickness direction. Although, in the present embodiment, a heat sealing device is used as the first melt bonded part forming device 154, the melt bonded part forming device may be suitably changed. In other embodiment, an ultrasonic sealing device may be used.

[Step ($e_3$)]

Step ($e_3$) will be described below.

The multilayer web S4 passing the first melt bonded part forming device 158 is cut in a cutter unit 160 and individual cleaning members 1 are cut out.

The cleaning member 1 manufactured in the present embodiment includes a sheet with slits 7. However, the sheet with slits 7 is not included in the cleaning member manufactured in other embodiment. Also, in the cleaning member 1 manufactured in the present embodiment, the receiving part 14 is situated on the surface of the cleaning member 1. However, in the cleaning member manufactured in other embodiment, by changing the order of superimposition of the substrate sheet 12 and the holding sheet 13 and the fibrous members 3 to 6, the receiving part 14 is disposed between adjoining fibrous members 3 to 6. With such construction, both faces of the cleaning member 1 can be used in cleaning. In this case, in order to facilitate insertion of the insertion part 16 into the receiving part 14, dimension in longitudinal direction (up-down direction in FIG. 3) of the substrate sheet 12 and the holding sheet 13 is preferably larger than that of the fibrous members 3 to 6, and this dimension can be arbitrarily chosen. Also in this case, the sheet with slits 7 may or may not be used, and the sheets with slits 7 may be disposed on both face of the cleaning member 1.

The cleaning member illustrated in FIG. 1 to FIG. 3 is an example of the cleaning members which can be produced using the method of producing a cleaning member and the system of producing a cleaning member according to the present disclosure. The method of producing a cleaning member and the system of producing a cleaning member according to the present disclosure can be used to produce a cleaning member as described in, for example, Japanese Unexamined Patent Publication No. 2000-296083, 2003-265390, 2003-268663, 2004-223692, 2005-046645, 2005-095665, 2005-111284, 2005-137929, 2005-137930, 2005-137931, 2005-144198, 2005-169148, 2005-199077, 2005-230573, 2005-237975, 2006-015164, 2006-034990, 2006-141483, 2007-135774, 2007-209460, 2007-209461, 2007-029136, 2007-111297, 2007-135666, 2007-136156, 2007-159612, 2007-236690, 2008-006260, 2008-119171, and 2007-029135, the entire disclosures of which are incorporated herein by reference.

The method of producing a cleaning member and the system of producing a cleaning member according to the present disclosure can be used to produce a cleaning member as described in, for example, U.S. Pat. No. 6,554,937B, US2002/148061A, US2003/0000934A, US2004/0149095A, US2005/0005381A, US2005/039285A, US2005/097695A, US2005/097696A, US2005/132521A, US2005/177967A, US2005/188490A, US2005/193513A, US2005/193514A, US2005/198760A, US2006/016035A, US2006/016036A, US2006/101601A, US2009/165230A and US2009/172904A, as well as US2009/049633A, US2009/255078A and US2010/154156A, the entire disclosures of which are incorporated herein by reference.

The present application claims the benefit of the following patent applications, the entire disclosures of which are incorporated herein by reference:

(1) JP Patent Application No. 2012-289181 filed on Dec. 29, 2012, and US patent application claiming priority thereof,
(2) JP Patent Application No. 2012-289182 filed on Dec. 29, 2012, and US patent application claiming priority thereof,
(3) JP Patent Application No. 2012-289174 filed on Dec. 29, 2012, and US patent application claiming priority thereof,
(4) JP Patent Application No. 2012-289189 filed on Dec. 29, 2012, and US patent application claiming priority thereof,
(5) JP Patent Application No. 2012-289175 filed on Dec. 29, 2012, and US patent application claiming priority thereof,
(6) JP Patent Application No. 2012-289188 filed on Dec. 29, 2012, and US patent application claiming priority thereof,
(7) JP Patent Application No. 2012-289179 filed on Dec. 29, 2012,
(8) JP Patent Application No. 2012-289177 filed on Dec. 29, 2012, and US patent application claiming priority thereof,
(9) JP Patent Application No. 2012-289184 filed on Dec. 29, 2012, and US patent application claiming priority thereof,
(10) JP Patent Application No. 2012-289178 filed on Dec. 29, 2012, and US patent application claiming the priority thereof,
(11) JP Patent Application No. 2012-289176 filed on Dec. 29, 2012, and US patent application claiming priority thereof,
(12) JP Patent Application No. 2013-002855 filed on Jan. 10, 2013, and US patent application claiming priority thereof, as well as
(13) JP Patent Application No. 2013-002857 filed on Jan. 10, 2013, and US patent application claiming priority thereof.

Reference Signs List

1—cleaning member, 2—brush part, 3—first fibrous member, 4—second fibrous member, 5—third fibrous member, 6—fourth fibrous member, 7—sheet with slits, 8—first melt bonded part, 11—second melt bonded part, 12—substrate sheet, 13—holding sheet, 14—receiving part, 15—holder, 16—insertion part, 16a—protrusion, 17—holder part, 18—melt bonding line, 20—reed-shaped part, 20a—incision, 100—apparatus for manufacturing cleaning member, 101a, b—feed roller (first driving roller), 102a, b—first nip roller (second driving roller), 104—tension roller, 106a, b—second nip roller, 108—air supplying device, 110—transfer roller, 112a, b—third nip roller, 114—oil agent bath, 120, 122, 150—non-woven fabric roll, 121, 123, 151—band-shaped non-woven fabric, 124, 126, 152—dancer roller, 128, 132, 136, 138, 140, 156—confluence point, 130—gather cutter, 134—second melt bonded part forming device, 154—gather roller, 158—first melt bonded part forming device, 160—cutter unit, 200—storage container of fiber bundle, F1—first fiber bundle, F2—second fiber bundle, F3—third fiber bundle, F4—fourth fiber bundle, B1—first non-rotational bar, B2—second non-rotational bar, B3—third non rotational bar, B4—fourth non-rotational bar, D1—first direction for feeding fiber bundle, D2—second direction for feeding fiber bundle, D3—third direction for feeding fiber bundle, D4—fourth direction for feeding fiber bundle, D5—fifth direction for feeding fiber bundle, D6—sixth direction for feeding fiber bundle

The invention claimed is:

1. A method of manufacturing a cleaning member having an opened fiber bundle, said method comprising:
   winding a fiber bundle drawn out continuously in a first direction from a storage container onto a first non-rotational bar provided in a direction intersecting the first direction, feeding the fiber bundle from the first non-rotational bar in a second direction different from the first direction, and thereafter, feeding the fiber bundle to a first driving roller;

winding the fiber bundle fed in a third direction from the first driving roller onto a second non-rotational bar provided in a direction intersecting the third direction, feeding the fiber bundle from the second non-rotational bar in a fourth direction different from the third direction, and thereafter, feeding the fiber bundle to a pair of first nip rollers rotating at a same constant peripheral velocity; and opening the fiber bundle fed from the pair of first nip rollers; and applying an oil agent to the fiber bundle during said opening or after said opening.

2. The method according to claim 1, wherein
a tension of the fiber bundle fed in the second direction is larger than a tension of the fiber bundle fed in the first direction, and
a tension of the fiber bundle fed in the fourth direction is larger than a tension of the fiber bundle fed in the third direction.

3. The method according to claim 1, wherein the first direction is a vertically upward direction with respect to the storage container.

4. The method according to claim 1, wherein the fiber bundle is wound onto the first non-rotational bar after the fiber bundle is drawn out 3 to 5 m from the storage container.

5. The method according to claim 1, wherein the fiber bundle is composed of crimped fibers.

6. The method according to claim 1, wherein the fiber bundle is pre-opened by
(i) said winding the fiber bundle drawn out continuously in the first direction from the storage container onto the first non-rotational bar, said feeding the fiber bundle from the first non-rotational bar in the second direction different from the first direction, and thereafter, said feeding the fiber bundle to the first driving roller, and
(ii) said winding the fiber bundle fed in the third direction from the first driving roller onto the second non-rotational bar, said feeding the fiber bundle from the second non-rotational bar in the fourth direction different from the third direction, and thereafter, said feeding the fiber bundle to the pair of first nip rollers rotating at the same constant peripheral velocity.

7. An apparatus for manufacturing a cleaning member having an opened fiber bundle, said apparatus comprising:
a storage container;
a first driving roller;
a first non-rotational bar;
a second non-rotational bar provided downstream of the first driving roller;
a pair of first nip rollers rotatable at a same constant peripheral velocity; and
a fiber bundle opening unit configured to open the fiber bundle fed from the pair of first nip rollers;
wherein the apparatus is configured such that the fiber bundle that is continuously drawn out from the storage container in a first direction is wound onto the first non-rotational bar provided in a direction intersecting the first direction, the fiber bundle is fed from the first non-rotational bar in a second direction different from the first direction, and thereafter, the fiber bundle is fed to the first driving roller; and
wherein the apparatus is further configured such that the fiber bundle fed from the first driving roller in a third direction is wound onto the second non-rotational bar provided in a direction intersecting the third direction, the fiber bundle is fed from the second non-rotational bar in a fourth direction different from the third direction, and thereafter, the fiber bundle is fed to the pair of first nip rollers.

8. The apparatus according to claim 7, the apparatus is configured such that
the fiber bundle fed in the second direction is imparted with a tension that is larger than a tension of the fiber bundle fed in the first direction, and
the fiber bundle fed in the fourth direction is imparted with a tension that is larger than a tension of the fiber bundle fed in the third direction.

9. The apparatus according to claim 7, wherein the first direction is a vertically upward direction with respect to the storage container.

10. The apparatus according to claim 7, wherein the apparatus is configured such that the fiber bundle is wound onto the first non-rotational bar after the fiber bundle is drawn out 3 to 5 m from the storage container.

11. The apparatus according to claim 7, further comprising an oil agent application unit configured to apply an oil agent to the fiber bundle.

12. The apparatus according to claim 7, wherein the fiber bundle that is continuously drawn out from the storage container is composed of crimped fibers.

13. The apparatus according to claim 11, wherein the fiber bundle that is continuously drawn out from the storage container is composed of crimped fibers.

14. The apparatus according to claim 7, wherein
the first driving roller includes a pair of feed rollers between the first and second non-rotational bars in a machine direction including the first, second, third, and fourth direction, and
the first non-rotational bar, the pair of feeding rollers, and the second non-rotational bar are upstream of the pair of first nip rollers which is configured to feed the fiber bundle further downstream to the fiber bundle opening unit in the machine direction.

* * * * *